UNITED STATES PATENT OFFICE.

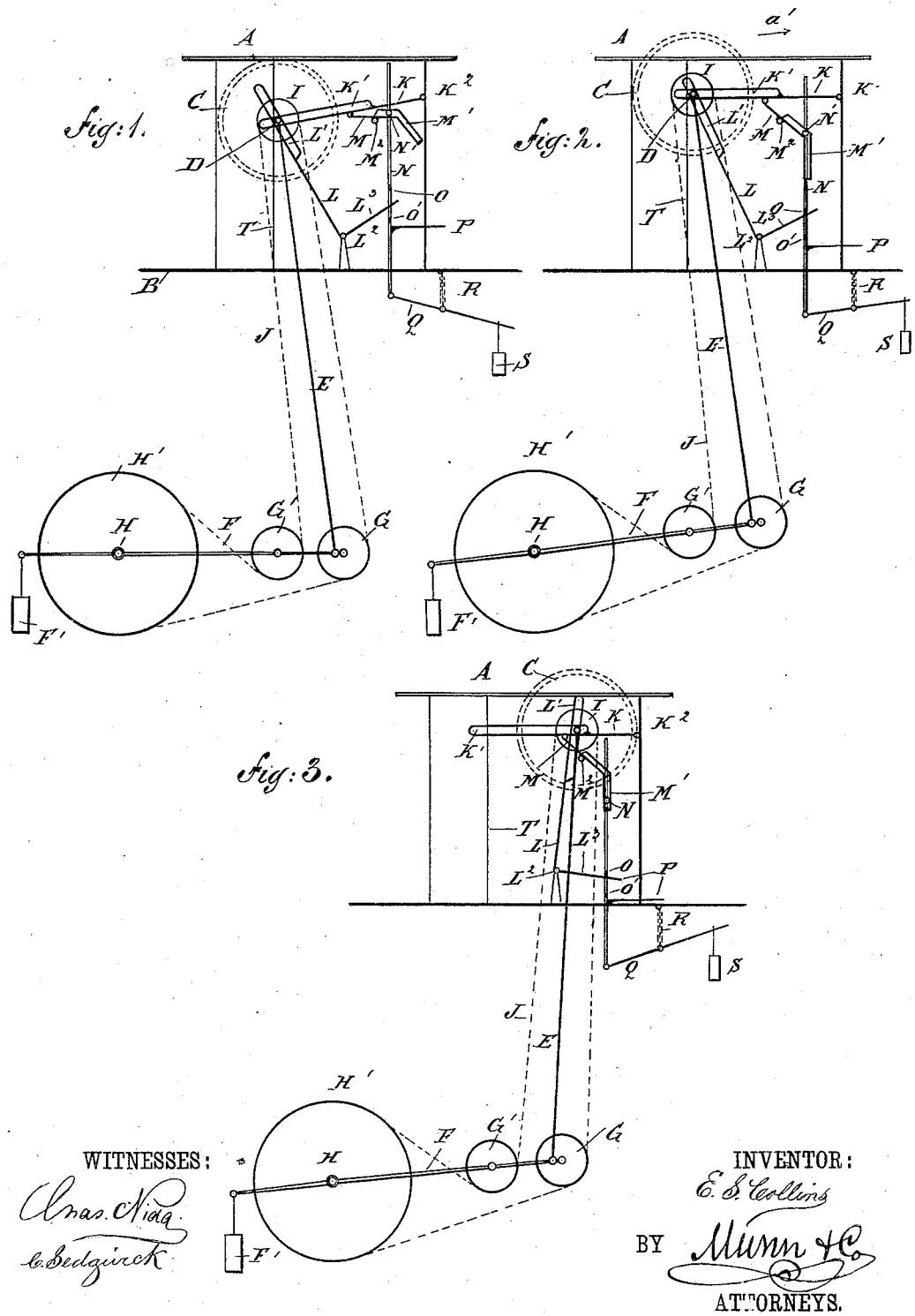

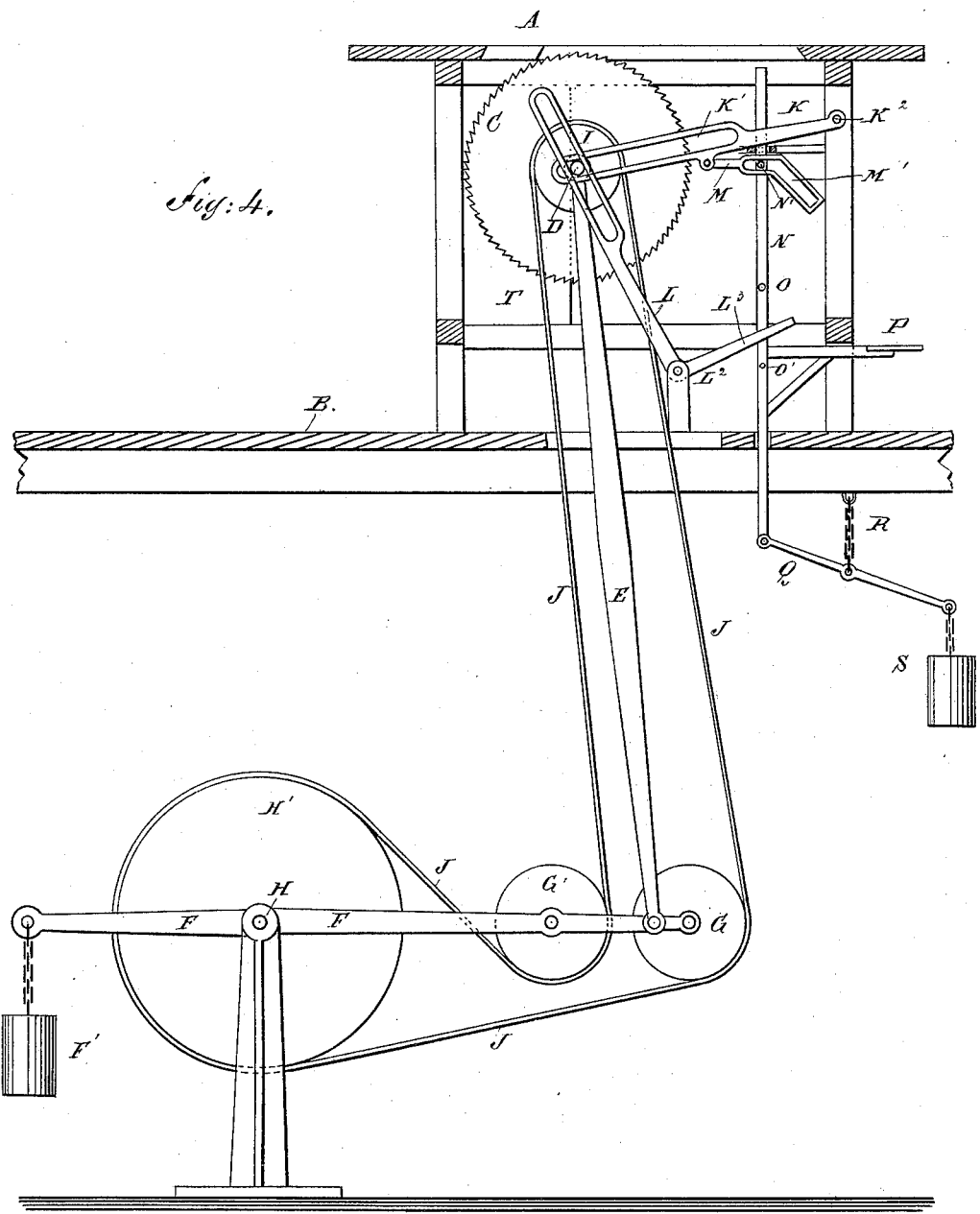

EVERELL S. COLLINS, OF MEADVILLE, PENNSYLVANIA.

CIRCULAR SAWING MACHINE.

SPECIFICATION forming part of Letters Patent No. 344,568, dated June 29, 1886.

Application filed March 11, 1886. Serial No. 194,941. (No model.)

*To all whom it may concern:*

Be it known that I, EVERELL S. COLLINS, of Meadville, in the county of Crawford and State of Pennsylvania, have invented a new and Improved Counter-Balance for Circular Saws, of which the following is a full, clear, and exact description.

The object of my invention is to provide a new and improved counter balance for circular saws, by which the saw is placed below the level of the table when not in use, and which is specially adapted for a limited space where the lumber to be sawed is to be hauled over the table.

The invention consists of a circular saw mounted on an arbor supported by a counter-balance, and of pivoted levers for swinging the saw upward to a cutting position on the table.

The invention also consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of my improvement, showing the circular saw below the level of the saw-table. Fig. 2 is a similar view of the same, illustrating the saw in its raised position; and Fig. 3 is a like view of the same, showing the circular saw ready for cutting. Fig. 4 is a side elevation, partly in section and on an enlarged scale, of my improvement.

The saw-table A, of suitable construction, is placed on a floor, B, below which is the arrangement for transmitting a rotary movement to the circular saw C, mounted on an arbor, D, having its bearing on the upper end of a rod, E, pivotally attached to the balance-frame F, carrying the loose pulleys G and G', and provided with the main driving-pulley H'. On the arbor D of the circular saw C is placed a pulley, I, over which passes an endless belt, J, which also passes over the loose pulleys G and G' and over the driving-pulley H'.

The arbor D is placed in a slot, K', of the lever K, pivoted at $K^2$ to the saw-table A, and in a slot, L', of the bell-crank lever L, pivoted at $L^2$ and having a short arm, $L^3$. To the lever K is pivotally secured the bell-crank lever M, pivoted at $M^2$, and having an angular slot, M', through which passes a pin, N', secured to the rod N, arranged to slide vertically in guides on the saw-table A.

The rod N is provided with two pins, O and O', between which is placed the short arm $L^3$ of the bell-crank lever L, and with the treadle P. To the lower end of the rod N is pivotally attached the balance-lever Q, suspended by the chain R, and having the counter-weight S. A counter-weight, F', is attached to one end of the balance-frame F.

An upright rod, T, is secured to the table A, against which rests the saw-arbor D when the circular saw is in its lowest position, as shown in Fig. 1. This rod prevents the circular saw from assuming a lower position than that shown.

The operation is as follows: The circular saw C in its normal position, as shown in Fig. 1, is below the level of the table A, so as to enable the operator to haul the lumber to be sawed across the table without interfering with the saw at all. When ready for cutting, the operator presses with his foot on the treadle P, which moves the rod N downward, so that the pin N' in the slot M' of the lever M forces the latter to assume the position shown in Fig. 2, and thereby raises the lever K, and, consequently, the arbor D and the circular saw C, to the position shown in Fig. 2. The short arm $L^3$ of the bell-crank lever L is now in contact with the upper pin, O, of the rod N, and when the treadle P is pressed farther down the bell-crank lever L, by the action of the pin O, will throw the arbor D, and, consequently, the circular saw C, forward in the direction of the arrow a', the arbor being guided in the slot K' of the lever K, and in the slot L' of the bell-crank lever L, until the circular saw assumes the position shown in Fig. 3.

By the above-described movements the rod E and the balancing-frame F are moved into the position shown in Figs. 2 and 3, and the entire apparatus is held in the position shown in Fig. 3, as long as the operator presses his foot on the treadle P, and as soon as he releases the treadle from pressure the circular saw will return to its original position by the action of the counter-weights S and F'. By the motion of the saw from the position shown in Fig. 2 to that in Fig. 3, the saw is adapted to cut lumber, stationary on the table A, of a greater width than without said motion.

In case it is not practicable to extend the saw-arbor D so that it may enter the slots K' and L' in the levers K and L, a pin may be fastened in a frame holding the saw-arbor and extending so as to enter the said slots in the levers K and L.

It will be noticed that if the pin engaging the levers K and L is placed farther down on the rod E than the saw and arbor D, the lever K will have to be curved to make the saw travel on a straight line parallel with the top of the table A.

Having thus fully described my invention, I claim as new and desire to secure by Letters Patent—

1. The combination of a counterbalanced frame, a rod pivoted to the same, a circular saw journaled in the end of the said rod, and means for raising the saw above the level of the saw-table, substantially as herein shown and described.

2. The combination, with a counterbalanced frame, a rod pivoted to the same, and a circular saw journaled in the end of the said rod, of a vertically-sliding and counterbalanced rod, a treadle on said rod, and intermediate mechanism between the said sliding rod and the arbor of the saw, substantially as herein shown and described.

3. In a sawing-machine, the combination, with a counterbalanced frame fulcrumed on the shaft of the driving-pulley and carrying loose pulleys, of a rod pivoted to the said counterbalanced frame, a circular saw journaled in the said rod, a pulley on the arbor of the saw, a sliding and counterbalanced rod provided with pins, and slotted levers for raising and lowering the saw from the said sliding rod, substantially as herein shown and described.

4. The combination of the circular saw C, mounted on an arbor, D, the rod E, and the balance-frame F, with the lever K, having the slot K', the bell-crank lever L, having the slot L', and the bell-crank lever M, having the slot M' and connected with the lever K, and the vertically-sliding rod N, having the pins N', O, and O' and provided with the treadle P, and the balance-lever Q, substantially as shown and described.

5. The combination of the circular saw C, mounted on an arbor D, the rod E, connected with the balance-frame F, pivoted to the shaft H, the driving-pulley H', the loose pulleys G and G', the bar T, and the belt J, with the lever K, having the slot K', the bell-crank lever L, having the slot L', the bell-crank lever M, having the slot M' and being connected with the lever K, and the vertically-sliding rod N, having the pins N', O, and O' and provided with the treadle P, and the balance-lever Q, suspended by the chain R and having the weight S, substantially as shown and described.

EVERELL S. COLLINS.

Witnesses:
ALTON C. LINDSEY,
JACOB L. KLINESTIVER.